(12) United States Patent
Calenzo

(10) Patent No.: US 12,526,992 B2
(45) Date of Patent: Jan. 13, 2026

(54) MEMORY CELL

(71) Applicant: STMicroelectronics International N.V., Geneva (CH)

(72) Inventor: Patrick Calenzo, Peypin (FR)

(73) Assignee: STMicroelectronics International N.V., Geneva (CH)

( * ) Notice: Subject to any disclaimer, the term of this patent is extended or adjusted under 35 U.S.C. 154(b) by 97 days.

(21) Appl. No.: 18/443,500

(22) Filed: Feb. 16, 2024

(65) Prior Publication Data

US 2024/0292612 A1 Aug. 29, 2024

(30) Foreign Application Priority Data

Feb. 27, 2023 (FR) ........................... 2301765

(51) Int. Cl.
| | | |
|---|---|---|
| *H10B 41/60* | (2023.01) | |
| *G11C 16/04* | (2006.01) | |
| *G11C 16/10* | (2006.01) | |
| *G11C 16/26* | (2006.01) | |
| *G11C 13/00* | (2006.01) | |

(52) U.S. Cl.
CPC ......... *H10B 41/60* (2023.02); *G11C 16/0416* (2013.01); *G11C 16/10* (2013.01); *G11C 16/26* (2013.01); *G11C 13/0004* (2013.01)

(58) Field of Classification Search
CPC ................................................. G11C 13/0004
USPC ......................................................... 365/163
See application file for complete search history.

(56) References Cited

U.S. PATENT DOCUMENTS

| | | | |
|---|---|---|---|
| 8,513,576 B2 * | 8/2013 | Kim ..................... | H10N 70/826 219/121.48 |
| 9,659,951 B1 | 5/2017 | Kim | |
| 2010/0039868 A1 | 2/2010 | Mitchell et al. | |

OTHER PUBLICATIONS

INPI Search Report and Written Opinion for priority application, FR 2301765, report dated Sep. 7, 2023, 10 pgs.

* cited by examiner

*Primary Examiner* — Jason Lappas
(74) *Attorney, Agent, or Firm* — Crowe & Dunlevy LLC

(57) ABSTRACT

A memory cell includes first, second, and third semiconductor regions laterally bounded by insulated conductive walls; a first insulating layer overlaying the first, second, and third semiconductor regions; and a second conductive layer disposed facing a part of each of first, second, and third semiconductor regions. A first top part of the first semiconductor region is first conductivity type doped and faces the second conductive layer. The second semiconductor region includes second top parts forming a transistor with the first insulating layer and second conductive layer. A third top part of the third semiconductor region is second conductivity type doped and faces the second conductive layer. To program the memory cell, an electrical field is applied between the first semiconductor region and the second conductive layer and electrical field is applied between the third semiconductor region and the second conductive layer.

27 Claims, 4 Drawing Sheets

MEMORY CELL

PRIORITY CLAIM

This application claims the priority benefit of French Application for U.S. Pat. No. 2,301,765, filed on Feb. 27, 2023, the content of which is hereby incorporated by reference in its entirety to the maximum extent allowable by law.

TECHNICAL FIELD

The present disclosure generally relates to the electronic devices and, in particular, to memories comprising programmable memory cells.

BACKGROUND

A large number of electronic devices comprise memories, and particularly programmable memories. However, some technologies of memory cells are not suitable for all circuits.

In addition, adapting memory cells to different technologies often causes requirement for very expansive further masking steps.

There is a need in the art to address all or some of the drawbacks of the known memory cells.

SUMMARY

One embodiment provides a method for using a programmable memory cell, the cell comprising first, second, and third semiconductor regions laterally bounded by insulated conductive walls, the memory cell further comprising a first insulating layer overlaying the first, second, and third regions and a second conductive layer disposed facing a part of each of first, second, and third regions, a first top part of the first region disposed facing the second layer being doped of a first conductivity type, the second region comprising second top parts, the second top parts forming a transistor with the first and second layers, a third top part of the third region disposed facing the second layer being doped of a second conductivity type. The method comprises: programming a first value into the memory cell by applying an electrical field comprised between 5 MV/cm and 10 MV/cm between the first region and the second layer; and programming a second value into the memory cell by applying an electrical field comprised between 5 MV/cm and 10 MV/cm between the third region and the second layer.

Another embodiment provides a programmable memory cell, the cell comprising first, second, and third semiconductor regions laterally bounded by insulated conductive walls, the memory cell further comprising a first insulating layer overlaying the first, second, and third regions and a second conductive layer disposed facing a part of each of first, second, and third regions, a first top part of the first region disposed facing the second layer being doped of a first conductivity type, the second region comprising second top parts, the second top parts forming a transistor with the first and second layers, a third top part of the third region disposed facing the second layer being doped of a second conductivity type, the cell being configured so that: a first value is programmed in the cell when an electrical field comprised between 5 MV/cm and 10 MV/cm is applied between the first region and the second layer; a second value is programmed in the cell when an electrical field comprised between 5 MV/cm and 10 MV/cm is applied between the third region and the second layer.

According to an embodiment, the transistor is a MOSFET transistor.

According to an embodiment, the first conductivity type is the P type and the second conductivity type is the N type.

According to an embodiment, programming the first value of the cell comprises the following steps: causing the second and third regions floating; applying a positive voltage to the first region so that an electrical field comprised between 5 MV/cm and 10 MV/cm is generated.

According to an embodiment, programming the second value of the cell comprises the following steps: causing the first and second regions floating; and applying a negative voltage to the third region so that an electrical field comprised between 5 MV/cm and 10 MV/cm is generated.

According to an embodiment, the generated electrical field is sensibly equal to 7 MV/cm.

According to an embodiment, the first region and the first and second layers form a first capacitor with a capacitive coupling ratio comprised between 0.2 and 0.5, and the third region and the first and second layers form a second capacitor with a capacitive coupling ratio comprised between 0.2 and 0.5.

According to an embodiment, the first, second, and third regions extend from a semiconductor region doped of the second conductivity type insulated from the substrate doped of the second conductivity type by a buried well doped of the first conductivity type.

According to an embodiment, the third layer is made of polysilicon.

According to an embodiment, each wall comprises an insulating envelope and a core made of polysilicon.

According to an embodiment, the cell is configured so that a step of sensing the memory cell comprises applying a positive voltage between the conduction terminals of the transistor and measuring the current flowing through the transistor, the first and third regions receiving a null voltage.

According to an embodiment, the method comprises: etching cavities at the locations of the insulated conductive walls; forming an insulating layer on the walls and bottom of the cavities; filling the cavities with a conductive material; depositing the first layer; doping the first, second, and third regions; and forming the second layer.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1A:
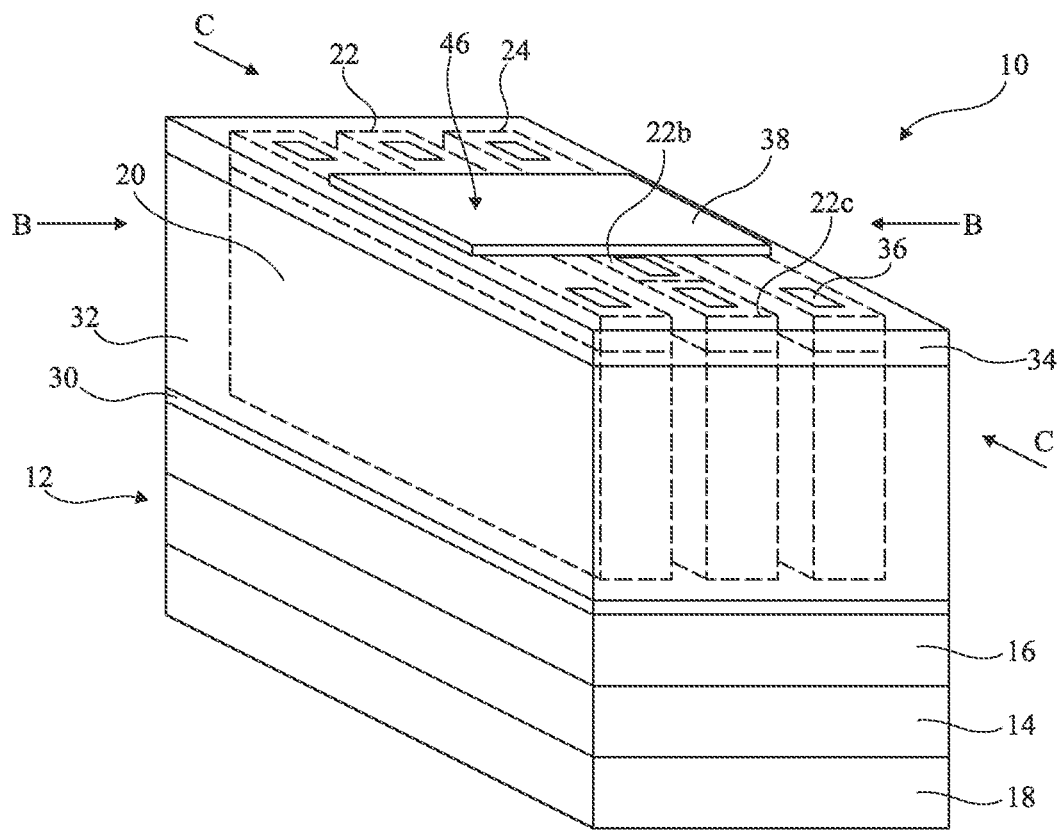
FIG. 1A illustrates a perspective view of an embodiment of a memory cell.
Figure 1B:
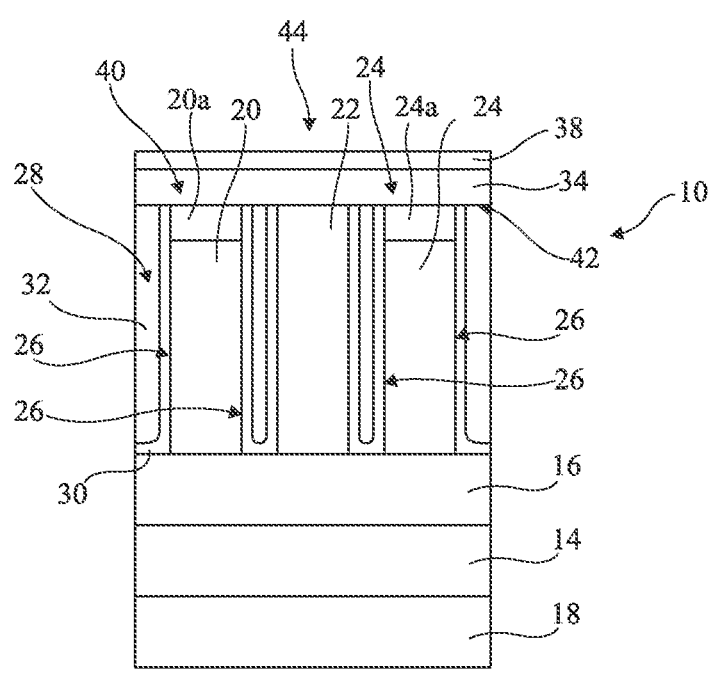
FIG. 1B illustrates cross-sectional view of the embodiment of FIG. 1A.
Figure 1C:
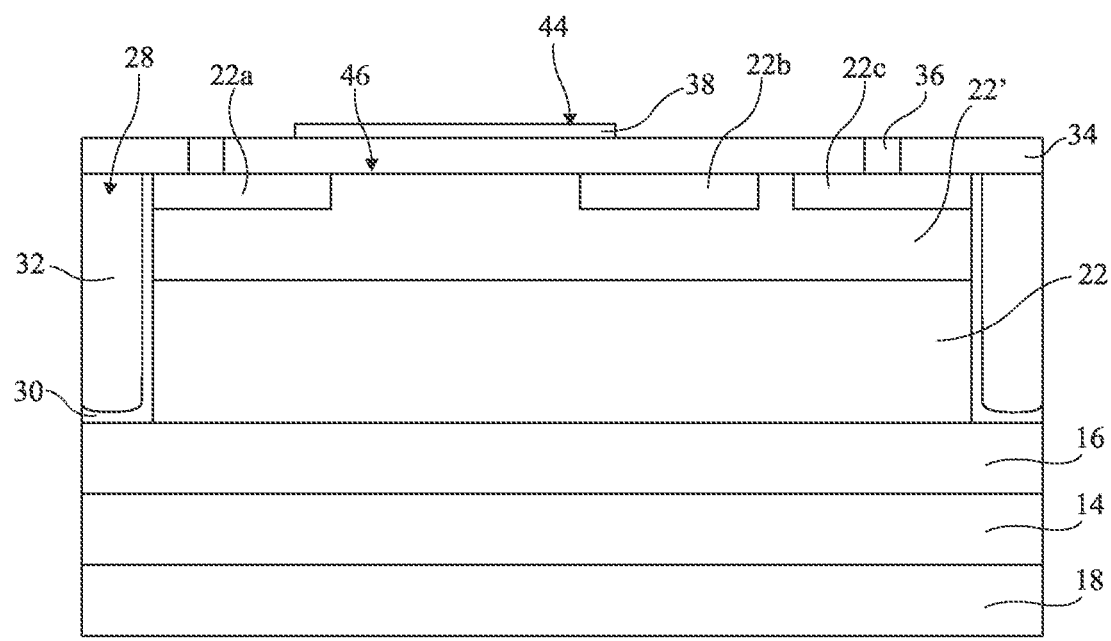
FIG. 1C illustrates a cross-sectional view of the embodiment of FIG. 1A.

FIGS. 1A and 1B illustrate an embodiment of a programmable memory cell 10. FIG. 1A illustrates a perspective view of an embodiment of a memory cell. FIG. 1B illustrates a cross-sectional view of the embodiment of FIG. 1A. More precisely, FIG. 1B illustrates the embodiment of FIG. 1A according to a cross-sectional plane B-B illustrated in FIG. 1A. FIG. 1C illustrates a cross-sectional view of the embodiment of FIG. 1A. More precisely, FIG. 1C illustrates the embodiment of FIG. 1A according to a cross-sectional plane C-C illustrated in FIG. 1A.

Cell 10 is formed in and on a semiconductor substrate 12. The substrate 12 comprises an intermediary region 14 allowing isolating from the remaining part of the substrate 12, i.e., from a bottom region 18 of the substrate, a top region 16 of the substrate 12. The regions 14, 16, and 18 are, for example, made of the same semiconductor material. The top region 16 is the region on which the memory cell is formed. The region 14 is, for example, a region doped of a first conductivity type, the regions 18 and 16 being doped of the second conductivity type. The regions 16 and 18 have, for example, the same conductivity type. Thus, the regions 16 and 18 are doped of the second conductivity type, e.g., the N type, and the region 14 is doped of the first conductivity type, e.g., the P type.

Alternatively, the region 14 might be a layer of an insulating material, for example silicon oxide. As an example, the substrate 12 might be a substrate of the semiconductor on insulator (SOI) type. The region 14 would then correspond to the insulating layer of the SOI substrate.

Regions 20, 22, 24 are disposed on the region 16. More precisely, the regions 20, 22, 24 extend from region 16. Preferably, the regions 20, 22, 24 have a same height. Preferably, the top faces of the regions 20, 22, 24 are coplanar. The regions 20, 22, 24 are represented by dotted lines in FIG. 1A. The regions 20, 22, 24 are made of a semiconductor material. The regions 20, 22, 24 are, for example, made of the material of the substrate 12. The regions 20, 22, 24 are preferably regions of the substrate. The regions 20, 22, 24 are, for example, parallelepiped-rectangular shaped. The regions 20, 22, 24 each form, for example, a rod. The regions 20, 22, 24 extend along parallel directions. In other words, seen from above, the main directions of the regions 20, 22, 24, i.e., the directions of the most significant sizes of the regions 20, 22, 24 are parallel to each other.

The region 20 comprises a top part 20a, corresponding to the farthest part of the region 16 away from region 14. The top part 201a forms the top face of the region 20. The top part 20a of the region 20 is doped of the second conductivity type, for example of the N type. The doping of the top part of the region 20 is higher than the doping of the remaining part of the region 20. The doping of the top part of the region 20 is, for example, higher than the doping of the region 18.

The region 24 comprises a top part 24a, corresponding to the farthest part of the region 16 away from region 14. The top part 24a forms the top face of the region 24. The top part of the region 24 is doped of the first conductivity type, for example of the P type. The remaining part of the region 24 is, for example, doped of the second conductivity type. The doping of the top part of the region 24 is, for example, higher than the doping of the region 14.

The region 22 comprises a top portion 22'. The top portion 22' is, for example, doped of the conductivity type opposite to the conductivity type of the bottom portion of the region 22, i.e., opposite to the conductivity type of the region 16, and of the region 18. The portion 22' extends from the top face of the region 22. Top parts 22a, 22b, and 22c are disposed, in the portion 22', at the top end of the region 22, i.e., the end of the region 22 furthest from the region 16. The parts 22a, 22b are of the same conductivity type, for example of the N type. The parts 22a and 22b are of the conductivity type opposite to the conductivity type of the portion 22'. The parts 22a and 22b are of the conductivity type opposite to the conductivity type of the part 22c. The parts 22a and 22b are doped of the second conductivity type. The part 22c is doped of the first conductivity type. The parts 22a, 22b, and 22c form the top face of the region 22. The parts 22a and 22b preferably have a doping level higher than the doping level of the bottom portion of the region 22. The part 22c preferably has a doping level higher than the doping level of the portion 22'. The parts 22a, 22b, and 22c are preferably separated from each other with portions of the portion 22'. Thus, the parts 22a, 22b, and 22c do not contact with each other.

In the example of FIGS. 1A and 1B, the region 22 is located between the region 20 and the region 24. The region 22 is thus separated from the region 20 with a cavity, or trench, 26, and from the region 24 with another trench 26. The cavities 26 are so-called deep cavities, i.e., at least 2 μm deep. The regions 20 and 24 are thus separated with two cavities 26 and the region 22. Alternatively, the region 24 could be disposed between the regions 20 and 22. Alternatively, the region 20 could be located between the regions 22 and 24.

The regions 20, 22, 24 are bounded with cavities 26. In other words, the regions 20, 22, 24 are separated from each other with the cavities 26. The regions 20, 22, 24 are laterally bounded with the cavities 26.

The cavities 26 are filled with insulated conductive walls 28. In other words, the regions 20, 22, 24 are bounded with walls 28. In other words, the regions 20, 22, 24 are separated from each other with the walls 28. The regions 20, 22, 24 are laterally surrounded with the walls 28. Each wall 28 comprises an insulating envelope 30 and a conductive core 32. In other words, the lateral walls and the bottom of the cavities 26 are overlaid with a conformal layer made of an insulating material, e.g., silicon oxide. The remaining part of the cavity is filled with a conductor material, preferably polysilicon.

Preferably, the regions 20, 22, 24 are only separated with the cavities 26 and the walls 28.

The cell further comprises an insulating layer 34 overlaying the top face of the substrate 12. More precisely, the layer 34 overlays the top face of the walls 28 and of the regions 20, 22, and 24. The layer 34 preferably entirely overlays the regions 20, 22, 24 except for locations at which contact pads 36 of the regions 20, 22, 24 are located. Each region 20, 22, 24 comprises at least one contact pad. More precisely, each part 20a, 22a, 22b, 22c, 24a comprises at least one contact pad 36. Thus, each part can be biased, preferably independently from the other parts 20a, 22a, 22b, 22c, 24a. The contact pads 36 of the part 20a are configured to receive a voltage V40. The contact pads 36 of the part 22a are configured to receive a voltage V46a. The contact pads 36 of the part 22b are configured to receive a voltage V46b. The contact pads 36 of the part 24a are configured to receive a voltage V42.

The cell further comprises a conductive layer 38 laying on the layer 34. The layer 38 is preferably made of polysilicon. The layer 38 is located facing a part of the region 20, of a part of the region 22, and of a part of the region 24. More precisely, the layer 38 is not located facing the whole region 20, neither the whole region 22, nor the whole region 24. The layer 38 is located facing a part of the walls 28, more precisely facing a part of the walls 28 located between the regions 20, 22, 24. More precisely, the layer 38 is located facing parts of the walls 28 located between the parts of the regions 20, 22, 24 overlaid by the layer 38. The layer 38 is located partly facing the parts 22a and 22b, and the portion 22' located between the parts 22a and 22b. The layer 38 does not overlay the pads 34. The layer 38 preferably overlays only the part 22a of the region 22.

The layer 38 is, for example, parallelepiped-rectangle shaped. The layer 38 is entirely made of a single material. The layer 38 preferably comprises a single continuous layer. The layer 38 does not comprise several conductive elements electrically connected. For example, the layer 38 comprises no conductive elements, for example neither conductive vias, nor electrical wires, coupling several conductive layers. There is thus a low risk of leakage of the charges located in the layer 38.

Preferably, layer 38 is not connected to a conductive element other than the regions 20, 22, 24 and the conductive cores 32 of the walls 28 surrounding the regions 20, 22, 24. In other words, the layer 38 is entirely insulated except the portions of the layer 38 contacting the regions 20, 22, 24 and the conductive cores 32 of the walls 28 surrounding the regions 20, 22, 24. The layer 38 is thus floating.

The layer 38, the layer 34, and the region 20 form a capacitor 40. More precisely, the portion of the part 20a facing the layer 38 constitutes an electrode of the capacitor 40. The portion of the layer 38 facing the region 20 constitutes another electrode of the capacitor 40. The portion of the layer 34 located between the region 20 and the layer 38 constitutes the insulator of the capacitor 40.

Similarly, the layer 38, the layer 34, and the region 24 form a capacitor 42. More precisely, the portion of the part 24a facing the layer 38 constitutes an electrode of the capacitor 42. The portion of the layer 38 facing the region 24 constitutes another electrode of the capacitor 42. The portion of the layer 34 located between the region 24 and the layer 38 constitutes the insulator of the capacitor 40.

The capacitors 40 and 42 are configured to operate by field-effect emission, or Fowler-Nordheim effect. For example, the layer 34 has a thickness of 70 Å, i.e. 7 nm, so as to allow the operating by field-effect emission. Additionally, the capacitors 40 and 42, and more particularly the sizes of the capacitors 40 and 42, are configured to have a capacitive coupling ratio comprised between 0.2 and 0.5, preferably sensibly equal to 0.3.

The region 22, the layer 34, and the layer 38 form a transistor 44, for example an insulated-gate field-effect transistor, or MOSFET. The parts 22a and 22b constitute the source and drain of the transistor 44, respectively. The portion of the region 22 located between the parts 22a and 22b constitutes the channel region of the transistor 44. The layers 34 and 38 constitute the gate of the transistor 44. More precisely, the layers 34 and 38 constitute the gate insulator and the conductor of the gate of the transistor 44, respectively. The part 22c corresponds to a contact area allowing the biasing of the portion 22'.

In addition, the layer 38, the layer 34, and the region 22 form a capacitor 46. More precisely, the portion of the part 22a facing the layer 38 constitutes an electrode of the capacitor 46. The portion of the layer 38 facing the part 22a constitutes another electrode of the capacitor 46. The portion of the layer 34 located between the part 22a and the layer 38 constitutes the insulator of the capacitor 46.

A method for manufacturing the cell of FIGS. 1A, 1B, 1C for example comprises the following steps, preferably successive:

forming, in a bulk semiconductor substrate doped of the second conductivity type, a buried well 14 doped of the first conductivity type, the well being buried by a height higher than the height of the regions 20, 22, 24;

forming cavities 26, so that the regions 20, 22, 24 are bounded;

forming the layer 30 conformally extending over the whole structure;

filling the cavities 26 with polysilicon;

removing the portions of the layer 30 and of the polysilicon located out of the cavities;

depositing the layer 34;

doping the parts 20a, 22a, 22b, 22c, 24a; and forming the layer 38.

Figure 2A:
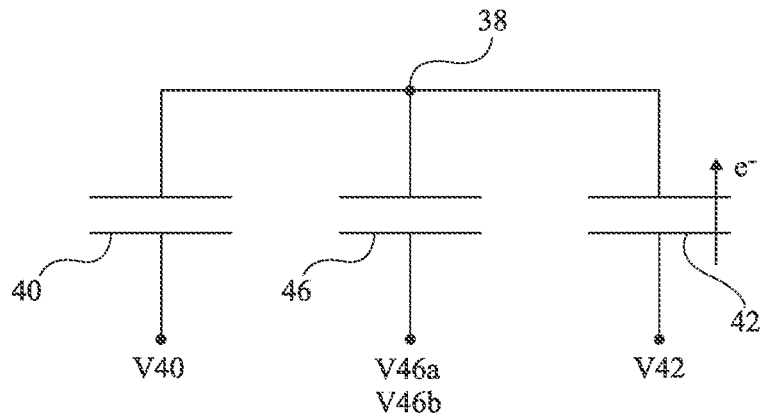
FIG. 2A illustrates a first step of an implementation mode of a method for programming the cell of FIGS. 1A and 1B.
Figure 2B:
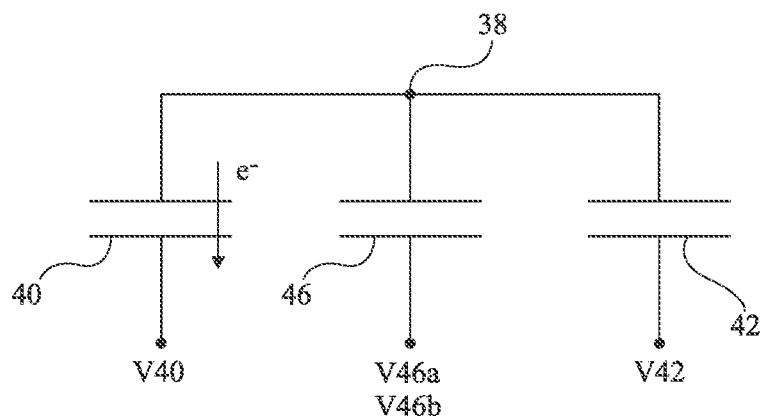
FIG. 2B illustrates a second step of an implementation mode of a method for programming the cell of FIGS. 1A and 1B.
Figure 2C:
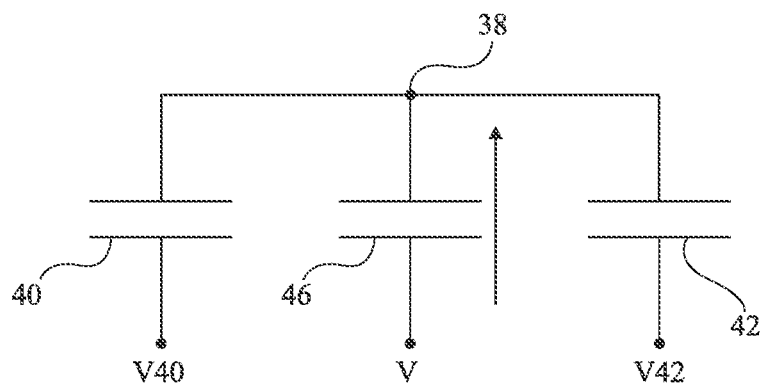
FIG. 2C illustrates an implementation mode of a method for sensing the cell of FIGS. 1A and 1B.

FIGS. 2A, 2B, 2C illustrate a method of using a memory cell such as the cell of FIGS. 1A-1C.

FIG. 2A illustrates a first step of an implementation mode of a method for programming the cell of FIGS. 1A and 1B. More precisely, FIG. 2A corresponds to a step of programming a first value into the memory cell. FIG. 2A for example corresponds to programming a binary value '1' into the memory cell.

During this step, the pads 36 configured to receive the voltages V40, V46a, V46b are floating. In other words, the pads 36 configured to receive the voltages V40, V46a, V46b do not receive voltage. For example, the pads 36 configured to receive the voltages V40, V46a, V46b are coupled to the nodes for applying the voltages V40 and V46a, V46b through transistors, said transistors being turned OFF during this step.

Further, the voltage V42 takes a negative value. Preferably, the voltage V42 is configured so that the electric field generated at the capacitor 42 is comprised between 5 MV/cm and 10 MV/cm, for example sensibly equal to 7 MV/cm. In the case where the layer 34 is 7 nm thick, where the capacitor 42 has a capacitive coupling ratio sensibly equal to 0.3, the voltage V42 applied is for example −10 V.

Applying such voltages allows charges to be injected from the part 22a of the region 22 towards layer 38.

FIG. 2B illustrates a second step of an implementation mode of a method for programming the cell of FIGS. 1A and 1B. More precisely, FIG. 2B corresponds to a step of programming a second value into the memory cell. FIG. 2B for example corresponds to programming the binary value '0' into the memory cell.

During this step, the pads 36 configured to receive the voltages V42, V46a, V46b are floating. In other words, the pads 36 configured to receive the voltages V42, V46a, V46b receive no voltage. For example, the pads 36 configured to receive the voltages V42, V46a, V46b are coupled to the nodes for applying the voltages V42 and V46a, V46b through transistors, said transistors being turned OFF during this step.

Further, the voltage V40 takes a positive value. Preferably, the voltage V40 is configured so that the electric field generated at the capacitor 40 is comprised between 5 MV/cm and 10 MV/cm, for example sensibly equal to 7 MV/cm. In the case where the layer 34 is 7 nm thick, where the capacitor 40 has a capacitive coupling ratio sensibly equal to 0.3, the voltage V40 applied is for example 10 V.

Applying such voltages allows charges to be injected from the layer 38 towards the part 20a.

FIG. 2C illustrates an implementation mode of a method for sensing the cell of FIGS. 1A and 1B.

During this step, a positive voltage is applied between the drain and the source of the transistor 44, in order to determine the charge amount of the layer 38. For example, the voltages V40, V42, V22a, and V22c are null. The voltage V22b has for example a positive value, for example comprised between 1 V and 5 V, for example equal to 3 V.

Figure 3:
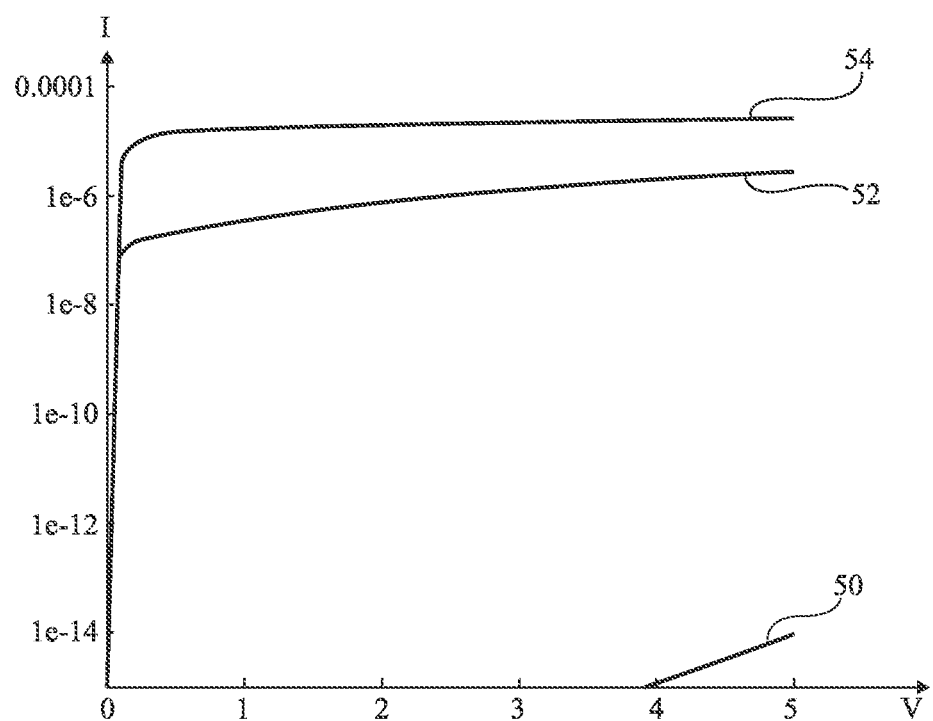
FIG. 3 illustrates different states of the memory cell of FIGS. 1A-C.

FIG. 3 illustrates the different states of the memory cell of FIGS. 1A-1C. More precisely, FIG. 3 illustrates the current I flowing through the transistor 44 between the drain and the source as a function of the voltage V applied between the drain and the source of the transistor 44. In the case of FIG. 3, i.e., in the case where the source is configured to receive a null voltage, the current I represented in FIG. 3 is a function of the voltage V at the drain of the transistor 44.

FIG. 3 comprises a curve 50 corresponding to the amount of charges into the layer 38 subsequent to the first step, described in relation with FIG. 2A, and curves 52 and 54 corresponding to amounts of charges that may be located into the layer 38 further to the second step, described in relation with FIG. 2B.

For example, the curve 50 corresponds to an amount of charges into the layer 38 sensibly equal to $9 \times 10^{-15}$, the curve 52 corresponds to an amount of charges into the layer 38 sensibly equal to $5 \times 10^{-15}$, and the curve 54 corresponds to an amount of charges into the layer 38 sensibly equal to $2 \times 10^{-15}$.

It will be noted that there is a great gap in the current between the curve 50 and the curves 52, 54. It is thus possible to differentiate two states of the memory cell by measuring the current flowing through the transistor 44, i.e., flowing through the region 22 between the parts 22a and 22b.

One advantage of the described embodiments is it is possible to manufacture a programmable memory cell using technologies for manufacturing MOSFET transistors.

Another advantage of the described embodiments is it is possible to manufacture a memory cell without adding any masking step to the methods for manufacturing MOSFET transistors.

Another advantage of the described embodiments is it is possible to program and sense the memory cell using low voltages.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A method for using a programmable memory cell, wherein the programmable memory cell comprises: first, second, and third semiconductor regions laterally bounded by insulated conductive walls, a first insulating layer overlaying the first, second, and third semiconductor regions and a second conductive layer disposed facing a part of each of the first, second, and third semiconductor regions, a first top part of the first semiconductor region doped of a first conductivity type and disposed facing the second conductive layer, the second semiconductor region comprising second top parts, the second top parts forming a transistor with the first insulating layer and second conductive layer, a third top part of the third semiconductor region doped of a second conductivity type and disposed facing the second conductive layer, wherein the second conductivity type is opposite the first conductivity type, the method comprising:
programming a first value into the programmable memory cell by applying an electrical field comprised between 5 MV/cm and 10 MV/cm between the first semiconductor region and the second conductive layer; and
programming a second value into the programmable memory cell by applying an electrical field comprised between 5 MV/cm and 10 MV/cm between the third semiconductor region and the second conductive layer.

2. The method according to claim 1, wherein the transistor is a MOSFET transistor.

3. The method according to claim 1, wherein the first conductivity type is P type and the second conductivity type is N type.

4. The method according to claim 1, wherein programming the first value of the programmable memory cell comprises applying a positive voltage to the first semiconductor region and wherein programming the second value of the programmable memory cell comprises applying a negative voltage to the third semiconductor region.

5. The method according to claim 1, wherein programming the first value of the programmable memory cell comprises the following steps:
causing the second and third semiconductor regions to be floating; and
applying a positive voltage to the first semiconductor region so that said electrical field comprised between 5 MV/cm and 10 MV/cm is generated.

6. The method according to claim 5, wherein the generated electrical field is equal to 7 MV/cm.

7. The method according to claim 1, wherein programming the second value of the programmable memory cell comprises the following steps:
causing the first and second semiconductor regions to be floating;
applying a negative voltage to the third semiconductor region so that said electrical field comprised between 5 MV/cm and 10 MV/cm is generated.

8. The method according to claim 7, wherein the generated electrical field is equal to 7 MV/cm.

9. The method according to claim 1, wherein the first semiconductor region and the first insulating layer and the second conductive layer form a first capacitor with a capacitive coupling ratio comprised between 0.2 and 0.5, and wherein the third semiconductor region and the first insulating layer and the second conductive layer form a second capacitor with a capacitive coupling ratio comprised between 0.2 and 0.5.

10. The method according to claim 1, wherein the first, second, and third semiconductor regions extend from a semiconductor region doped of the second conductivity type and insulated from a substrate doped of the second conductivity type by a buried well doped of the first conductivity type.

11. The method according to claim 1, wherein the second conductive layer is made of polysilicon.

12. The method according to claim 1, wherein each insulated conductive wall comprises an insulating envelope and a core made of polysilicon.

13. The method according to claim 1, further comprising sensing the programmable memory cell by:
applying a positive voltage between conduction terminals of the transistor;
applying a null voltage to the first and third semiconductor regions; and
measuring a current flowing through the transistor.

14. A programmable memory cell, comprising:
first, second, and third semiconductor regions laterally bounded by insulated conductive walls;
a first insulating layer overlaying the first, second, and third semiconductor regions; and
a second conductive layer disposed facing a part of each of the first, second, and third semiconductor regions;
wherein a first top part of the first semiconductor region is doped of a first conductivity type and disposed facing the second conductive layer;
wherein the second semiconductor region comprises second top parts, the second top parts forming a transistor with the first insulating layer and second conductive layer;
wherein a third top part of the third semiconductor region is doped of a second conductivity type and disposed facing the second conductive layer; and
wherein the second conductivity type is opposite the first conductivity type.

15. The programmable memory cell according to claim 14, configured to:
program a first value in the programmable memory cell in response to application of an electrical field comprised between 5 MV/cm and 10 MV/cm between the first semiconductor region and the second conductive layer; and
program a second value in the programmable memory cell in response to application of an electrical field comprised between 5 MV/cm and 10 MV/cm between the third semiconductor region and the second conductive layer.

16. The programmable memory cell according to claim 15, wherein the first value is programmed by:
causing the second and third semiconductor regions to be floating; and
applying a positive voltage to the first semiconductor region so that the electrical field comprised between 5 MV/cm and 10 MV/cm is generated.

17. The programmable memory cell according to claim 16, wherein the generated electrical field is equal to 7 MV/cm.

18. The programmable memory cell according to claim 15, wherein the second value is programmed by:
causing the first and second semiconductor regions to be floating; and
applying a negative voltage to the third semiconductor region so that the electrical field comprised between 5 MV/cm and 10 MV/cm is generated.

19. The programmable memory cell according to claim 18, wherein the generated electrical field is equal to 7 MV/cm.

20. The programmable memory cell according to claim 14, wherein the transistor is a MOSFET transistor.

21. The programmable memory cell according to claim 14, wherein the first conductivity type is P type and the second conductivity type is N type.

22. The programmable memory cell according to claim 14, wherein the first semiconductor region and the first insulating layer and the second conductive layer form a first capacitor with a capacitive coupling ratio comprised between 0.2 and 0.5, and wherein the third semiconductor region and the first insulating layer and the second conductive layer form a second capacitor with a capacitive coupling ratio comprised between 0.2 and 0.5.

23. The programmable memory cell according to claim 14, wherein the first, second, and third semiconductor regions extend from a semiconductor region doped of the second conductivity type and insulated from a substrate doped of the second conductivity type by a buried well doped of the first conductivity type.

24. The programmable memory cell according to claim 14, wherein the second conductive layer is made of polysilicon.

25. The programmable memory cell according to claim 14, wherein each insulated conductive wall comprises an insulating envelope and a core made of polysilicon.

26. The programmable memory cell according to claim 14, configured to sense the programmable memory cell by:
applying a positive voltage between conduction terminals of the transistor;
applying a null voltage to the first and third semiconductor regions; and
measuring a current flowing through the transistor.

27. The programmable memory cell according to claim 14, configured to:
program the first value of the programmable memory cell by applying a positive voltage to the first semiconductor region; and
configured to program the second value of the programmable memory cell by applying a negative voltage to the third semiconductor region.

* * * * *